United States Patent
Chuang et al.

(10) Patent No.: US 8,235,543 B2
(45) Date of Patent: Aug. 7, 2012

(54) COMPENSATION METHOD FOR ALLEVIATING COLOR SHADING IN DIGITAL IMAGE

(75) Inventors: Che-Lun Chuang, Hsinchu (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 742 days.

(21) Appl. No.: 12/472,911

(22) Filed: May 27, 2009

(65) Prior Publication Data
US 2010/0208990 A1 Aug. 19, 2010

(30) Foreign Application Priority Data
Feb. 13, 2009 (TW) ................................ 98104733 A

(51) Int. Cl.
*G06K 9/00* (2006.01)
(52) U.S. Cl. ........ 362/167; 382/173; 348/242; 348/251; 348/624; 358/461
(58) Field of Classification Search .................. 382/167, 382/173; 348/242, 251, 624; 358/461
See application file for complete search history.

(56) References Cited

U.S. PATENT DOCUMENTS

| | | | | |
|---|---|---|---|---|
| 4,695,884 A | * | 9/1987 | Anastassiou et al. | 348/615 |
| 7,231,098 B2 | * | 6/2007 | Wang | 382/274 |
| 2007/0285552 A1 | * | 12/2007 | Kim | 348/335 |
| 2010/0054588 A1 | * | 3/2010 | Simson et al. | 382/167 |

* cited by examiner

*Primary Examiner* — Chan S Park
*Assistant Examiner* — Eueng-Nan Yeh
(74) *Attorney, Agent, or Firm* — Morris Manning & Martin LLP; Tim Tingkang Xia, Esq.

(57) ABSTRACT

A compensation method for alleviating color shading in a digital image is adapted to correct a color shading phenomenon in a digital image that causes luminance differences between regions in the digital image. The compensation method includes capturing a uniform color block image; calculating horizontal compensation coefficients of a plurality of horizontal segments of the color block image; performing a linear interpolation process on the horizontal compensation coefficients to generate corresponding horizontal interpolation coefficients, and calculating determination horizontal correction coefficients corresponding to all the horizontal segments, respectively; calculating vertical compensation coefficients of a plurality of vertical segments; multiplying the determination horizontal correction coefficients by the vertical compensation coefficients, respectively, so as to obtain a color shading compensation coefficient of each segment, respectively; and multiplying an average luminance value of each segment by a corresponding color shading compensation coefficient, respectively, thus compensating for color shading in the color block image.

6 Claims, 6 Drawing Sheets

COMPENSATION METHOD FOR ALLEVIATING COLOR SHADING IN DIGITAL IMAGE

CROSS-REFERENCE TO RELATED APPLICATIONS

This non-provisional application claims priority under 35 U.S.C. §119(a) on Patent Application No(s). 098104733 filed in Taiwan, R.O.C. on Feb. 13, 2008 the entire contents of which are hereby incorporated by reference.

BACKGROUND OF THE INVENTION

1. Field of Invention

The present invention relates to an image processing technology, and more particularly to a compensation method for alleviating color shading in a digital image.

2. Related Art

When a conventional digital camera is used to capture a digital image, the digital camera resolves the reflected light into light of three primary colors, i.e., red (R), green (G) and blue (B), guides the light of the three primary colors to a photoelectric converter such as a charge-coupled device (CCD) for conversion into an analog signal of the light of the three primary colors. The analog signal of the light of the three primary colors is converted into a digital signal by an analog-to-digital converter and then output.

When a digital image of a uniform color block is captured in a uniform luminance environment by using the above digital camera, it is often found that edges of the digital image are darker than the center of the digital image, which is called a color shading phenomenon. This phenomenon is mainly due to the energy attenuation caused by the light refraction. The light is refracted by a lens such that an image is presented on the CCD. The light passing through edges of the lens is refracted at a larger angle than that passing through the center of the lens, so the energy attenuation of the light at the edges is greater than that at the center. As a result, the edges of the digital image are relatively dark, and thus color shading occurs.

In order to solve the color shading problem, a method is proposed in the prior art. In this method, an image of a uniform color block is captured in a uniform luminance environment. Then, the image is cut into, for example, M*N segments. An average luminance value of each segment is calculated, and the segment having the largest average luminance value is found from the segments. An average pixel value of the segment is used as a theoretical average luminance value of the entire image without light attenuation, and attenuation rates of other segments can be calculated according to the largest average luminance value and the average luminance values of the other segments. A Compensation coefficient corresponding to each segment can be respectively obtained by dividing the largest average pixel value by an average pixel value of each segment. As such, the energy attenuation caused by color shading can be compensated by multiplying pixels of the captured image by this set of compensation coefficients.

The above method can solve the color shading problem; however, as the compensation coefficients of the M*N segments of the image constitute a curvilinear function, and the memory of an image capturing device such as a camera is limited at present, a long time is required for satisfying the requirements of the curvilinear function.

In order to save the memory consumed for solving the color shading problem, a new method is further proposed. In this method, firstly, an image of a uniform color block is captured in a uniform luminance environment. Then, the image is cut into M segments in a horizontal direction, a segment having the largest average luminance value is found from the segments, and an average luminance value of the segment having the largest average pixel value is used as a theoretical horizontal average pixel value of the entire image without light attenuation. A plurality of horizontal compensation coefficients that is actually required can be obtained by dividing the largest average luminance value by average luminance values of respective segments. However, in order to reduce the required memory, the compensation coefficient of the segment closest to edges of the uniform color block can be set to a reference coefficient, and the segment having the largest average pixel value is linearly interpolated by using the reference coefficient to obtain a plurality of difference coefficients. The reference coefficient and the difference coefficients constitute a linear function, which can replace the original curve constituted by the horizontal compensation coefficients. Then, the image is cut into N segments in a vertical direction. A segment having the largest average luminance value is found from the segments, and the average luminance value of the segment is used as a theoretical vertical average luminance value of the entire image without light attenuation. A compensation coefficient can be obtained by dividing the largest average pixel value by an average pixel value of each segment. Compensation coefficients of the entire image can be obtained by multiplying the horizontal compensation coefficients by the vertical compensation coefficients. As such, the energy attenuation can be compensated by multiplying pixels of the captured image by this set of compensation coefficients.

The above method can effectively save the memory required for color shading compensation; however, as the energy attenuation in the horizontal direction does not change linearly, but the attenuation rate becomes higher towards the edge, overcompensation may occur if the original horizontal compensation curve is replaced by a linear function.

Therefore, currently, there is a need to provide a new image process technology so as to solve the problem in the prior art.

SUMMARY OF THE INVENTION

Accordingly, the present invention is a compensation method for alleviating color shading in a digital image, so as to reduce color shading in a digital image.

The present invention is a compensation method for alleviating color shading in a digital image, so as to reduce color shading in a digital image while saving the memory.

The present invention is a compensation method for alleviating color shading in a digital image, so as to accurately compensate for color shading in a digital image and avoid overcompensation.

In order to achieve the foregoing and other objectives, the compensation method for alleviating color shading in a digital image of the present invention is adapted to correct a color shading phenomenon in a digital image that causes luminance differences between regions in the digital image. The compensation method comprises: providing a uniform color block, and capturing a color block image of the color block; cutting the color block image into a plurality of horizontal segments in a horizontal direction, and calculating horizontal compensation coefficients corresponding to the horizontal segments, respectively; performing an interpolation process to linearly interpolate the horizontal compensation coefficients, so as to generate a plurality of horizontal interpolation coefficients; finding out corresponding horizontal compensation coefficients of the same horizontal segments according to the horizontal interpolation coefficients, and dividing the horizontal interpolation coefficients by the corresponding horizontal compensation coefficients to obtain a plurality of horizontal correction coefficients; multiplying the horizontal correction coefficients by corresponding horizontal interpolation coefficients, respectively, so as to obtain a plurality of determination horizontal correction coefficients, and obtaining determination horizontal correction coefficients corresponding to all the horizontal segments, respectively, by linearly interpolating any two adjacent determination horizontal correction coefficients; cutting the color block image into a plurality of vertical segments in a vertical direction, and calculating vertical compensation coefficients corresponding to the vertical segments, respectively; multiplying the determination horizontal correction coefficients by the vertical compensation coefficients, respectively, so as to obtain a color shading compensation coefficient of each segment of the color block image, respectively; and multiplying an average luminance value of each segment of the color block image by a corresponding color shading compensation coefficient, respectively, thus compensating for color shading in the color block image.

According to the compensation method for alleviating color shading in a digital image of the present invention, the color shading in the digital image can be compensated according to the color shading compensation coefficients finally obtained, such that the energy attenuation of the light at the edges of the digital image is reduced.

Here, the color block image comprises green pixels, red pixels, and blue pixels.

In addition, the step of calculating the horizontal compensation coefficients corresponding to the horizontal segments, respectively, may comprise: calculating a horizontal average luminance value corresponding to each horizontal segment; selecting a largest average luminance value from the horizontal average luminance values corresponding to the horizontal segments, and defining the largest average luminance value as a horizontal reference luminance value; and dividing the horizontal reference luminance value by the horizontal average luminance values, so as to generate the horizontal compensation coefficients.

Moreover, the step of calculating the vertical compensation coefficients corresponding to the vertical segments, respectively, may comprise: calculating a vertical average luminance value corresponding to each vertical segment; selecting a largest average luminance value from the vertical average luminance values corresponding to the vertical segments, and defining the largest average luminance value as a vertical reference luminance value; and dividing the vertical reference luminance value by the vertical average luminance values, so as to generate the vertical compensation coefficients.

As the color shading phenomenon is characterized by the luminance attenuation from the center to the edges of the color block image, the step of calculating the horizontal interpolation coefficients mainly comprises calculating two symmetrical linear line segments, and the calculation of one of the two line segments is described below. The step of calculating the horizontal interpolation coefficients may comprise: using a horizontal compensation coefficient of a horizontal segment closest to edges of the color block image as a reference coefficient; and performing an interpolation from the reference coefficient serving as a starting value towards the horizontal compensation coefficient of the horizontal segment having the largest horizontal average luminance value every a plurality of horizontal segments, so as to obtain a plurality of difference coefficients. Therefore, horizontal interpolation coefficients of a linear line segment may comprise a reference coefficient and a plurality of difference coefficients.

The determination horizontal correction coefficients overlap with a portion of the horizontal compensation coefficients in fact, and the determination horizontal correction coefficients can be connected into a plurality of linear line segments, so the determination horizontal correction coefficients of other horizontal segments can be obtained by linearly interpolating any two adjacent determination horizontal correction coefficients.

In the prior art, the color block image is cut into M*N segments, and corresponding compensation coefficients of the segments are calculated, respectively, resulting in that a large amount of memory is consumed. In the compensation method for alleviating color shading in a digital image of the present invention, the plurality of determination horizontal interpolation coefficients are obtained by correcting the horizontal interpolation coefficients, and the determination horizontal interpolation coefficients of other horizontal segments are then obtained by interpolating the obtained determination horizontal interpolation coefficients. As most of the determination horizontal interpolation coefficients are obtained by linear interpolation, the present invention can save a significant amount of memory, as compared with the prior art.

Also, in the prior art, overcompensation is caused when the horizontal compensation coefficients are obtained by linear interpolation. In the compensation method for alleviating color shading in a digital image of the present invention, the plurality of determination horizontal interpolation coefficients are obtained by using the desirable horizontal compensation coefficients to correct the horizontal interpolation coefficients, and the linear line segments constituted by the determination horizontal interpolation coefficients fit the desirable horizontal compensation coefficient curve better than the single linear line segment in the prior art. Therefore, as compared with the prior art, the present invention can accurately compensate for color shading in the color block image, and can thus avoid the overcompensation problem in the prior art.

As can be seen from the above description, the compensation method for alleviating color shading in a digital image of the present invention can solve the disadvantages of the prior art and can surely contribute to the development of the industry.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The compensation method for alleviating color shading in a digital image according to the present invention is applicable to an electrical device having an image capturing function, and may be built in a storage device of the electronic device through software or firmware programs, and then realized by a processor of the electronic device by executing the built-in software or firmware programs in combination with the image capturing function. Here, the electronic device may be, but not limited to, a computer having the image capturing function, a mobile phone having the image capturing function, or a personal digital assistant (PDA) having the image capturing function.

Figure 1A:
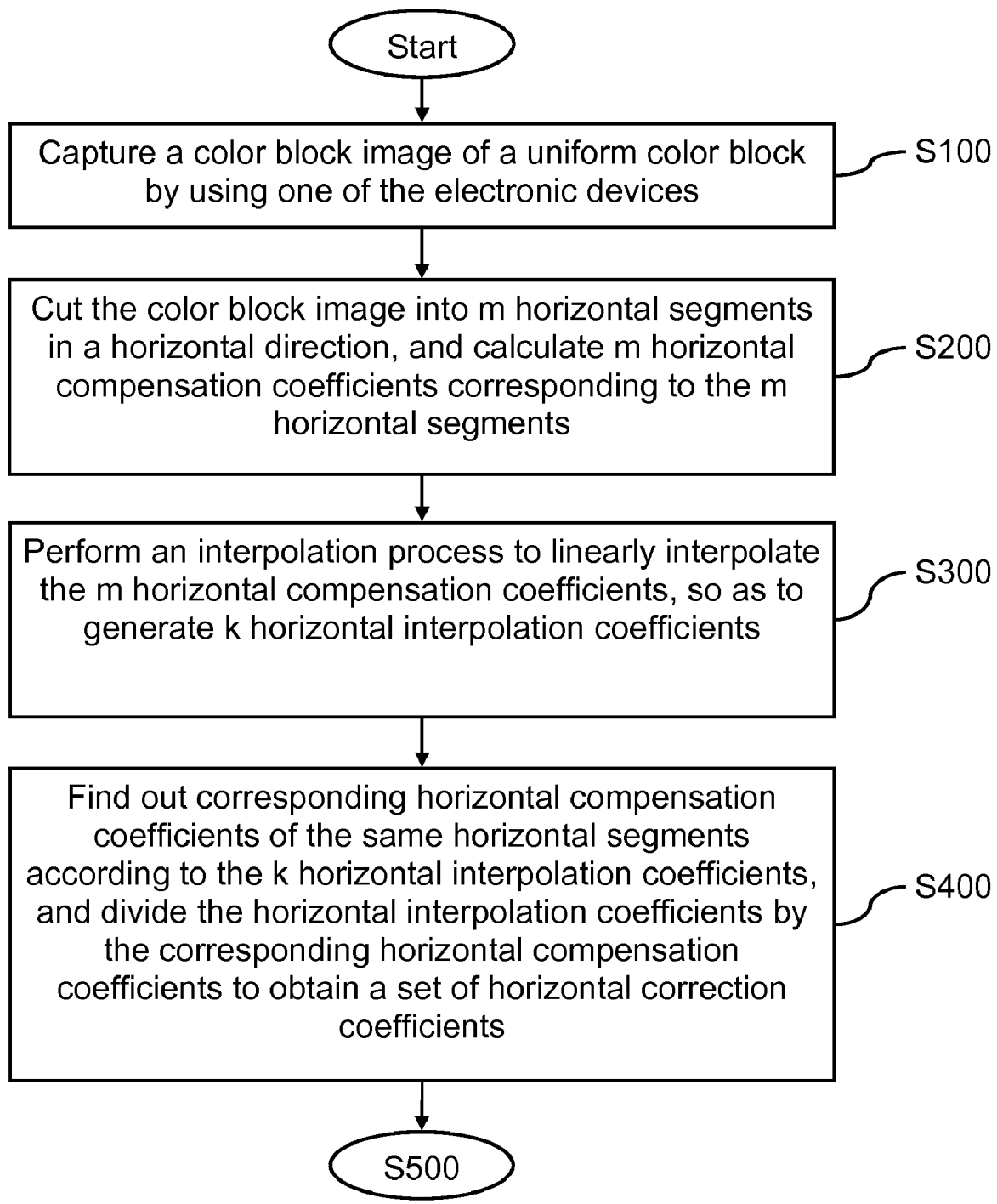
FIGS. 1A and 1B are a flow chart according to an embodiment of the present invention.
Figure 1B:
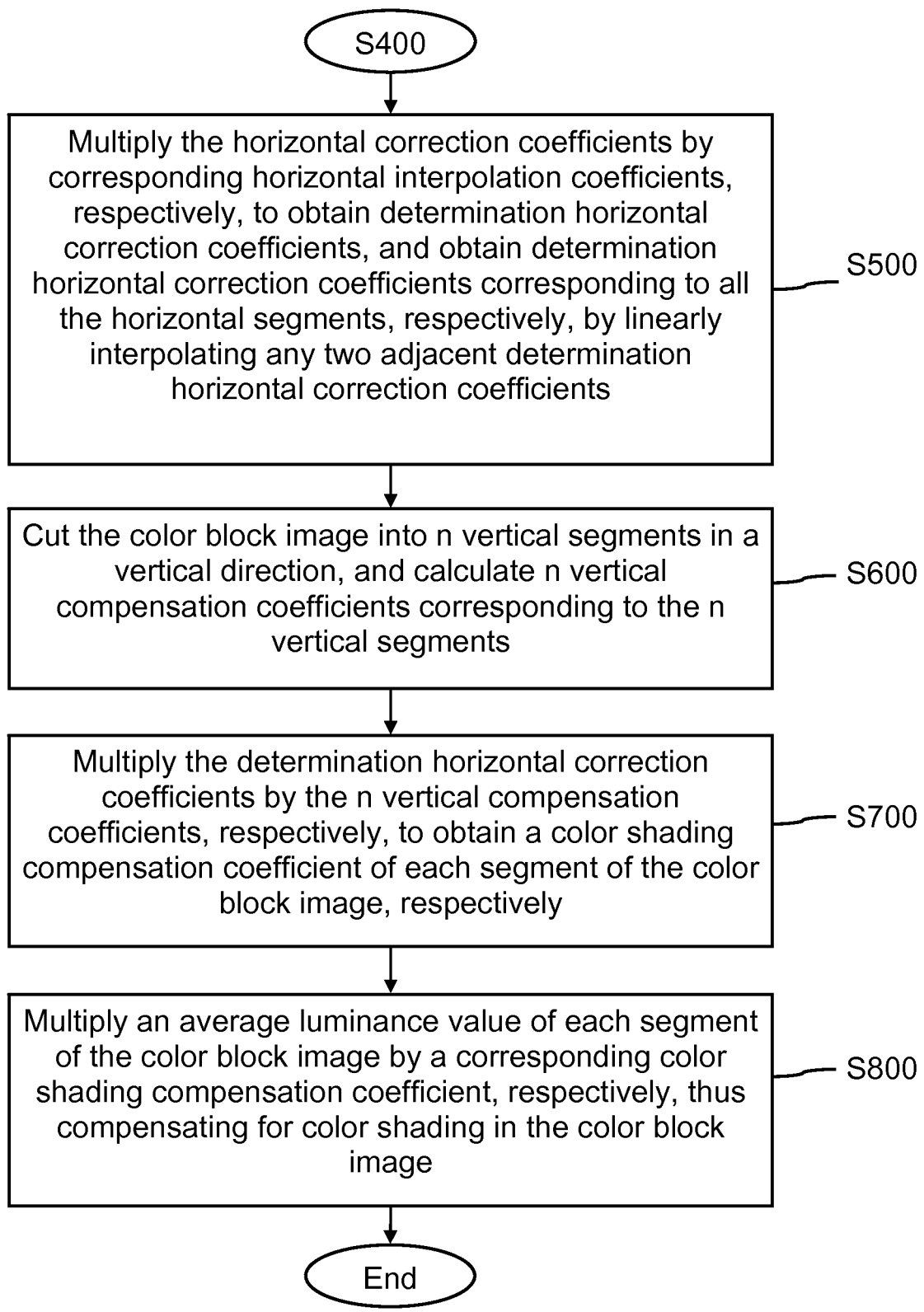

FIGS. 1A and 1B are a flow chart according to an embodiment of the present invention. The method of the present invention comprises the following steps.

In Step S100, a color block image of a uniform color block is captured by using one of the electronic devices.

In Step S200, the color block image is cut into m horizontal segments in a horizontal direction, and m horizontal compensation coefficients corresponding to the m horizontal segments are calculated.

In Step S300, an interpolation process is performed to linearly interpolate the m horizontal compensation coefficients, so as to generate k horizontal interpolation coefficients.

In Step S400, corresponding horizontal compensation coefficients of the same horizontal segments are found out according to the k horizontal interpolation coefficients, and the horizontal interpolation coefficients are divided by the corresponding horizontal compensation coefficients to obtain a set of horizontal correction coefficients.

In Step S500, the horizontal correction coefficients are multiplied by corresponding horizontal interpolation coefficients, respectively, so as to obtain determination horizontal correction coefficients, and determination horizontal correction coefficients corresponding to all the horizontal segments are obtained, respectively, by linearly interpolating any two adjacent determination horizontal correction coefficients In Step S600, the color block image is cut into n vertical segments in a vertical direction, and n vertical compensation coefficients corresponding to the n vertical segments are calculated.

In Step S700, the determination horizontal correction coefficients are multiplied by the n vertical compensation coefficients, respectively, so as to obtain a color shading compensation coefficient of each segment of the color block image, respectively.

In Step S800, an average luminance value of each segment of the color block image is multiplied by a corresponding color shading compensation coefficient, respectively, thus compensating for color shading in the color block image.

Here, the horizontal segments are $\{H_1, H_2, \ldots, H_i, \ldots, H_{m-1}, H_m\}$, and the horizontal compensation coefficients are $\{FH_1, FH_2, \ldots, FH_i, \ldots, FH_{m-1}, FH_m\}$, where m is the total number of the horizontal segments of the color block image, $H_i$ is the $i^{th}$ horizontal segment of the color block image, $FH_i$ is the horizontal compensation coefficient of the $i^{th}$ horizontal segment, and i is a positive integer.

In addition, the color block image may comprise green pixels, red pixels, and blue pixels.

Figure 2:
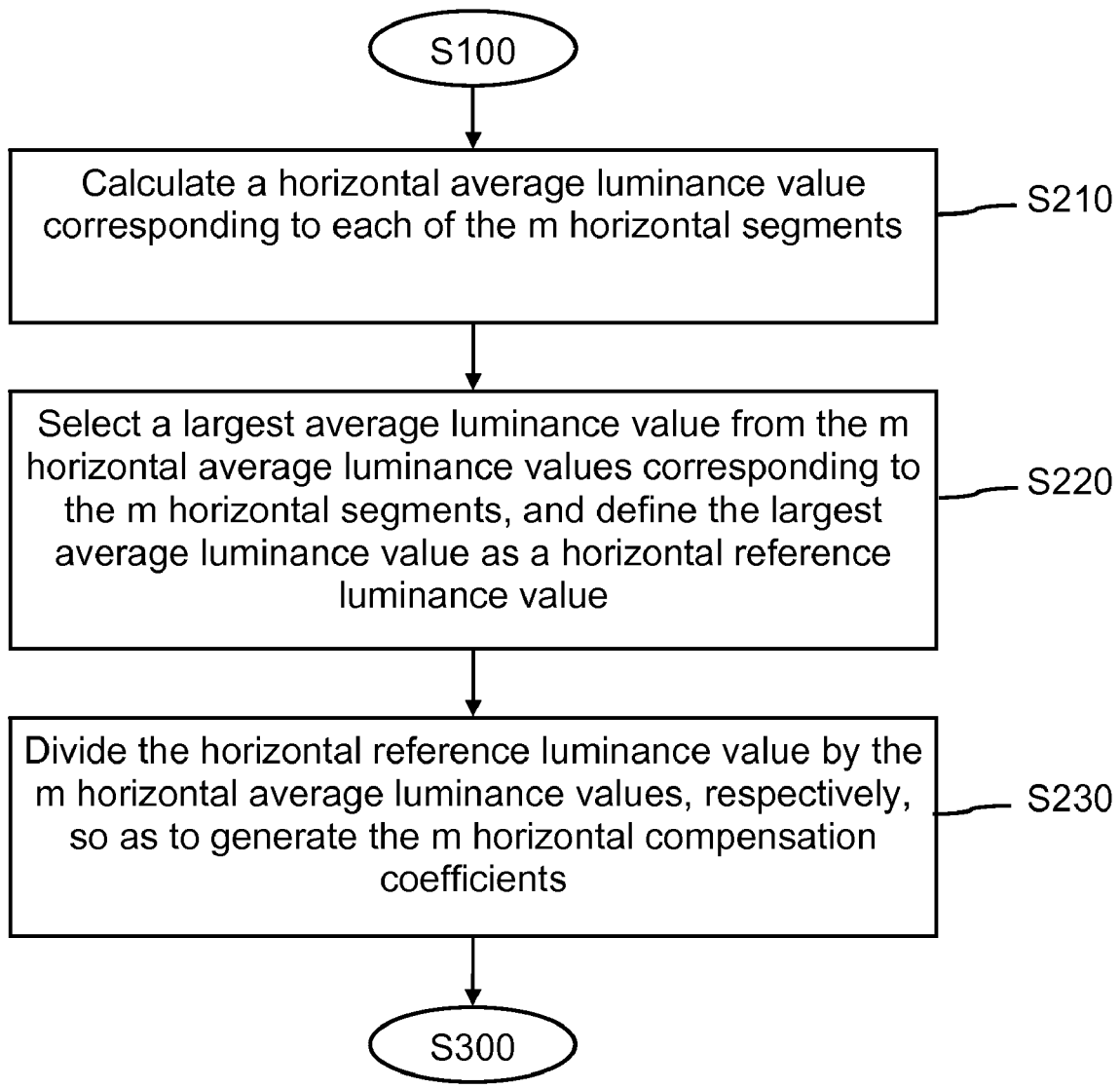
FIG. 2 is a flow chart of the step of calculating horizontal compensation coefficients according to an embodiment of the present invention.

FIG. 2 is a flow chart of the step of calculating horizontal compensation coefficients according to an embodiment of the present invention. Step S200 may comprise the following implementation steps.

In Step S210, a horizontal average luminance value corresponding to each of the m horizontal segments is calculated.

In Step S220, a largest average luminance value is selected from the m horizontal average luminance values corresponding to the m horizontal segments, and defined as a horizontal reference luminance value.

In Step S230, the horizontal reference luminance value is divided by the m horizontal average luminance values, respectively, so as to generate the m horizontal compensation coefficients.

Here, the horizontal average luminance values corresponding to the horizontal segments may be calculated by using the following equation:

$$\overline{H_i} = \frac{1}{p}\sum_{x=1}^{p} H_{i(x)}$$

where
$\overline{H_i}$
is the horizontal average luminance value of the $i^{th}$ horizontal segment, p is the total pixel number of the $i^{th}$ horizontal segment, x is the $x^{th}$ pixel of the $i^{th}$ horizontal segment,
$H_{i(x)}$
is the luminance value of the $x^{th}$ pixel of the $i^{th}$ horizontal segment, and i, p, and x are all positive integers.

In addition, the horizontal compensation coefficients may be calculated by using the following equation:

$$FH_i = \frac{\text{Max}_{\overline{H}}}{\overline{H_i}}$$

where
$FH_i$
is the horizontal compensation coefficient of the $i^{th}$ horizontal segment,
$\overline{H_i}$
is the horizontal average luminance value of the $i^{th}$ horizontal segment,
$\text{Max}_{\overline{H}}$
is the horizontal reference luminance value, and i is a positive integer.

Figure 3:
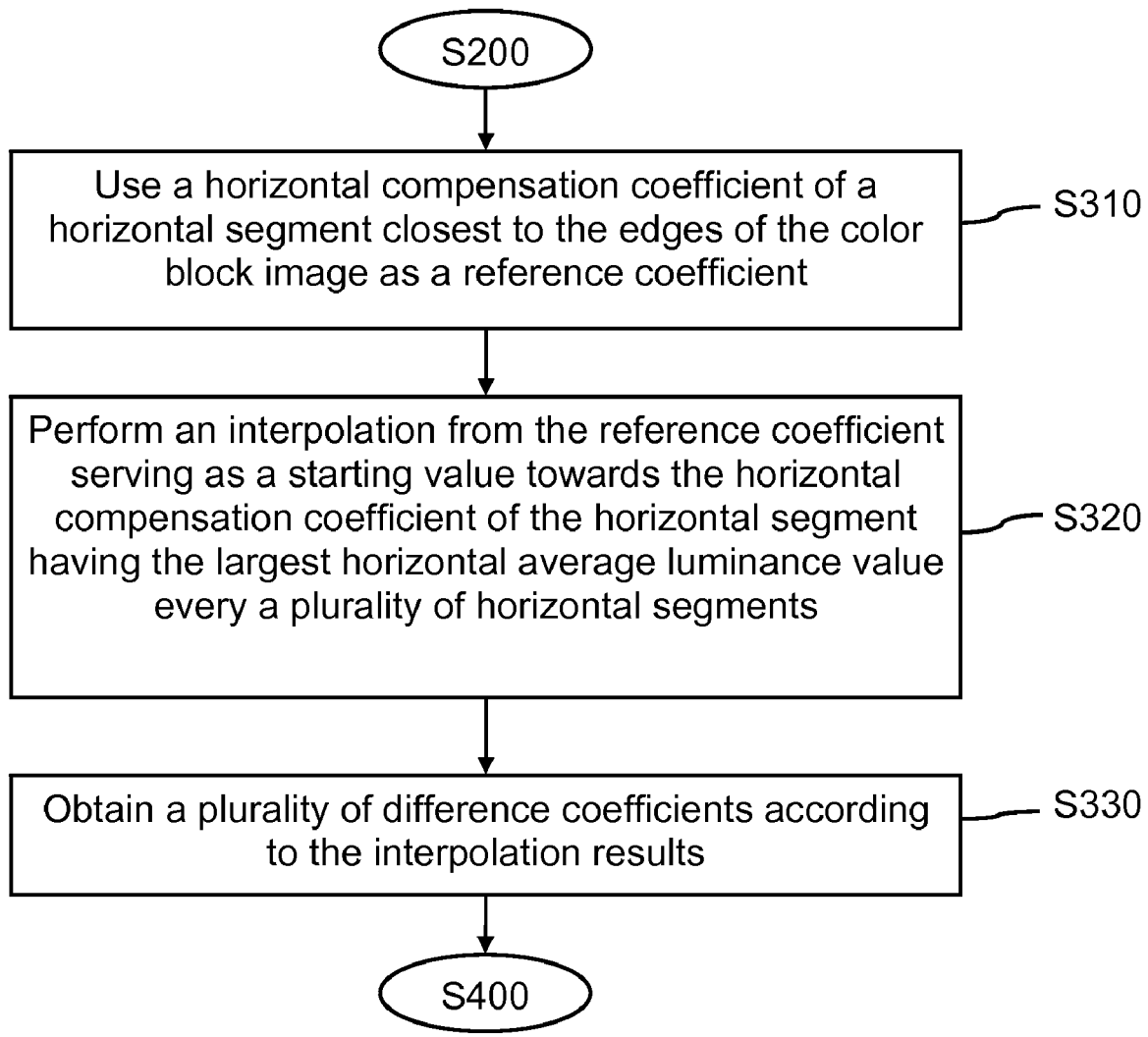
FIG. 3 is a flow chart of the step of calculating horizontal interpolation coefficients according to an embodiment of the present invention.

Moreover, the horizontal interpolation coefficients described in Step S300 are $\{FI_1, FI_2, \ldots, FI_j, \ldots, FI_{k-1}, FI_k\}$, where $FI_j$ is the $j^{th}$ horizontal interpolation coefficient, j is a positive integer, and k is the total number of the horizontal interpolation coefficients. As the color shading phenomenon is characterized by the luminance attenuation from the center to the edges of the color block image, the step of calculating the horizontal interpolation coefficients mainly comprises calculating two symmetrical linear line segments, and the calculation of one of the two line segments is described below. FIG. 3 is a flow chart of the step of calculating horizontal interpolation coefficients according to an embodiment of the present invention. The step of calculating the horizontal interpolation coefficients may comprise the following steps.

In Step S310, a horizontal compensation coefficient of a horizontal segment closest to the edges of the color block image is used as a reference coefficient.

In Step S320, an interpolation is performed from the reference coefficient serving as a starting value towards the horizontal compensation coefficient of the horizontal segment having the largest horizontal average luminance value every a plurality of horizontal segments.

In Step S330, a plurality of difference coefficients is obtained according to the interpolation results.

Therefore, horizontal interpolation coefficients of a linear line segment may comprise a reference coefficient and a plurality of difference coefficients. Equations for calculating $FI_j$ are as follows:

$$FI_1 = FH_1, \quad FI_2 = \frac{FH_{1+D} - FH_1}{D},$$

$$FI_3 = \frac{FH_{1+2D} - FH_{1+D}}{D},$$

$$FI_4 = \frac{FH_{1+3D} - FH_{1+2D}}{D}, \ldots,$$

$$FI_j = \frac{FH_{1+(j-1)D} - FH_{1+(j-2)D}}{D} \circ$$

where D is a positive integer.

Figure 4:
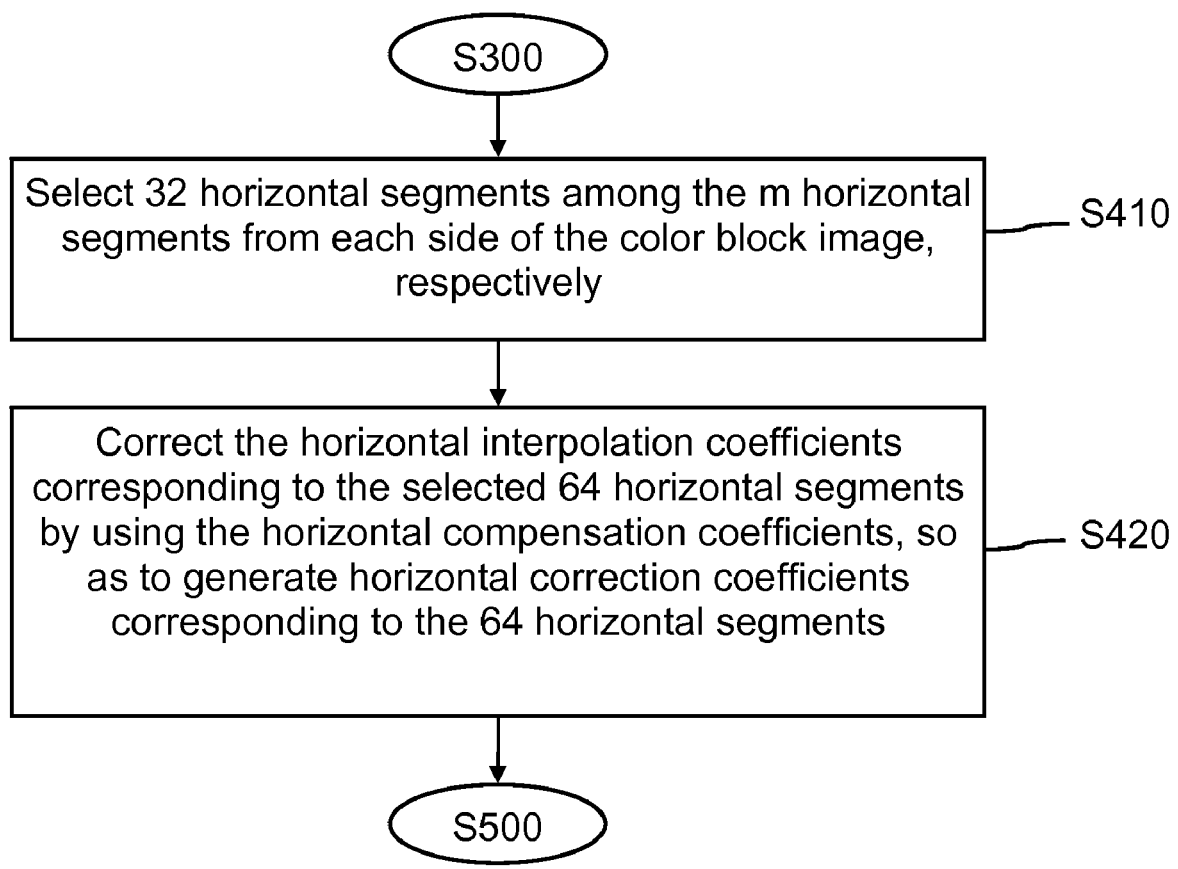
FIG. 4 is a flow chart of the step of calculating horizontal correction coefficients according to an embodiment of the present invention.

FIG. 4 is a flow chart of the step of calculating horizontal correction coefficients according to an embodiment of the present invention. For ease of illustration, it is assumed that among the m horizontal segments of the color block image, 32 horizontal segments are selected from each side of the image. Although 32 horizontal segments are described herein, the number of the segments may be adjusted as required. Step S400 may comprise the following implementation steps.

In Step S410, 32 horizontal segments are selected among the m horizontal segments from each side of the color block image, respectively.

In Step S420, the horizontal interpolation coefficients corresponding to the selected 64 horizontal segments are corrected by using the horizontal compensation coefficients, so as to generate horizontal correction coefficients corresponding to the 64 horizontal segments.

Here, the selected 64 horizontal segments are $\{H_1, H_2, \ldots, H_{31}, H_{32}, H_{m-31}, H_{m-30}, \ldots, H_{m-1}, H_m\}$, and the horizontal correction coefficients FC are $\{FC_1, FC_2, \ldots, FC_{31}, FC_{m-31}, FC_{m-30}, \ldots, FC_{m-1}, FC_m\}$, where $\{H_1, H_2, \ldots, H_{31}, H_{32}\}$ represents 32 horizontal segments selected among the m horizontal segments from one side of the color block image, and $\{H_{m-31}, H_{m-30}, \ldots, H_{m-1}, H_m\}$ represents 32 horizontal segments selected among the m horizontal segments from the other side of the color block image. Equations for calculating the horizontal correction coefficient FC are as follows:

$$FC_1 = \frac{FH_1}{FI_1}, \quad FC_2 = \frac{FH_2}{FI_1 + FI_2},$$

$$FC_3 = \frac{FH_3}{FI_1 + 2 \times FI_2}, \ldots, FC_{1+D} = \frac{FH_{1+D}}{FI_1 + D \times FI_2},$$

$$FC_{1+D+1} = \frac{FH_{1+D+1}}{FI_1 + D \times FI_2 + FI_3}, FC_{1+D+2} = \frac{FH_{1+D+2}}{FI_1 + D \times FI_2 + 2FI_3}, \ldots,$$

$$FC_{1+D+D} = \frac{FH_{1+D+D}}{FI_1 + D \times FI_2 + D \times FI_3}, \ldots \circ,$$

where D is a positive integer.

Moreover, the vertical segments are $\{V_1, V_2, \ldots, V_j, \ldots, V_{n-1}, V_n\}$, and the vertical compensation coefficients are $\{FV_1, FV_2, \ldots, FV_j, \ldots, FV_{n-1}, FV_n\}$, where n is the total number of the vertical segments of the color block image, $V_j$ the $j^{th}$ vertical segment of the color block image, $FV_j$ is the vertical compensation coefficient of the $j^{th}$ vertical segment, and j is a positive integer.

In addition, the vertical compensation coefficients may be calculated by using the following equation:

$$FV_j = \frac{\mathrm{Max}_{\overline{V}}}{\overline{V}_j}$$

where $FV_j$ is the vertical compensation coefficient of the $j^{th}$ vertical segment, $\overline{V}_j$ is the vertical average luminance value of the $j^{th}$ vertical segment, $\mathrm{Max}_{\overline{V}}$ is the vertical reference luminance value, and j is a positive integer.

Moreover, the determination horizontal correction coefficients overlap with a portion of the horizontal compensation coefficients in fact, and the determination horizontal correction coefficients can be connected into a plurality of linear line segments, so the determination horizontal correction coefficients of other horizontal segments can be obtained by linearly interpolating any two adjacent determination horizontal correction coefficients.

Figure 5:
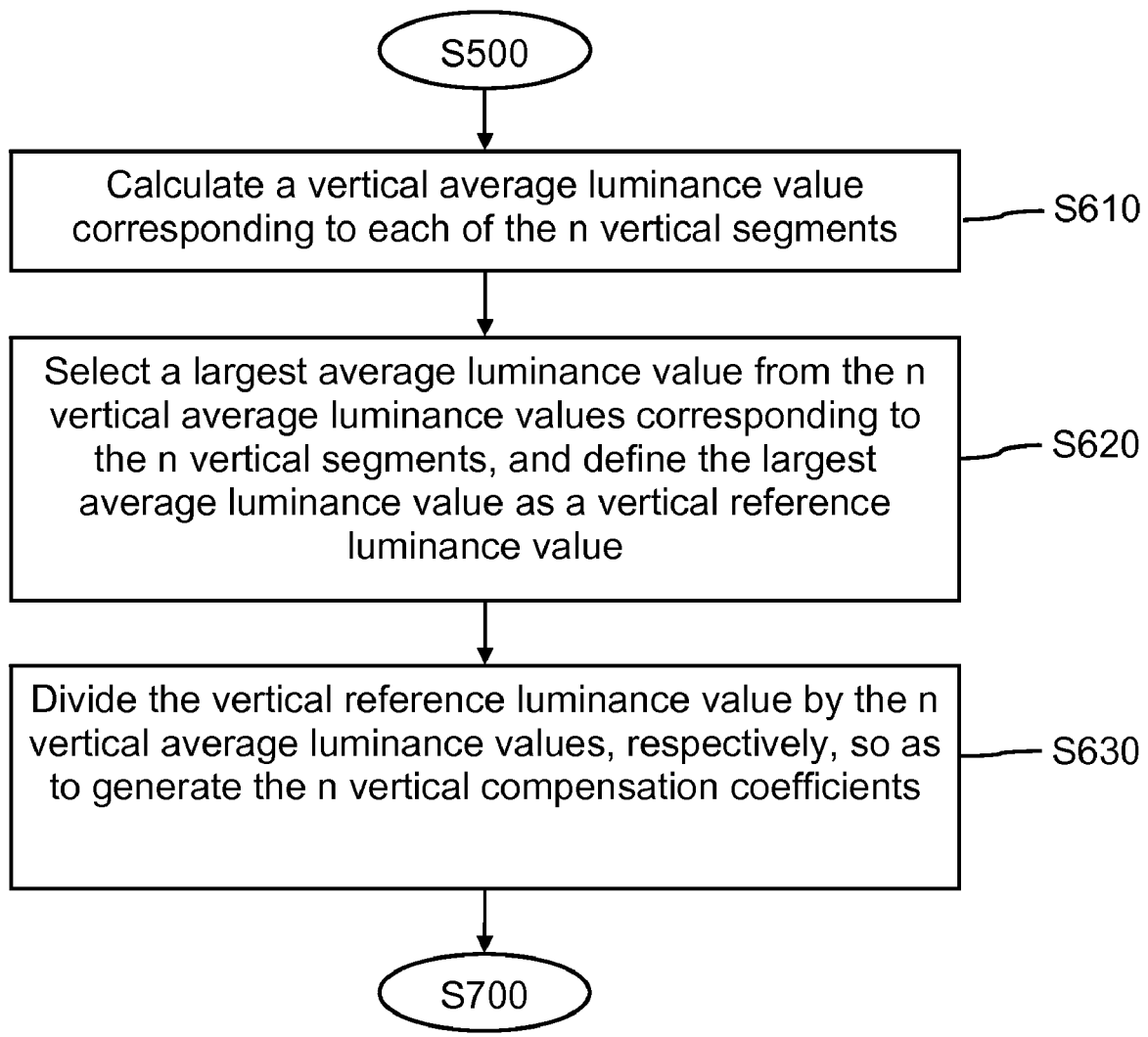
FIG. 5 is a flow chart of the step of calculating vertical compensation coefficients according to an embodiment of the present invention.

FIG. 5 is a flow chart of the step of calculating vertical compensation coefficients according to an embodiment of the present invention. Step S600 may comprise the following implementation steps.

In Step S610, a vertical average luminance value corresponding to each of the n vertical segments is calculated.

In Step S620, a largest average luminance value is selected from the n vertical average luminance values corresponding to the n vertical segments, and defined as a vertical reference luminance value.

In Step S630, the vertical reference luminance value is divided by the n vertical average luminance values, respectively, so as to generate the n vertical compensation coefficients.

Here, the vertical average luminance values corresponding to the vertical segments may be calculated by using the following equation:

$$\overline{V}_j = \frac{1}{q} \sum_{y=1}^{q} V_{j(y)}$$

where $\overline{V}_j$ is the vertical average luminance value of the $j^{th}$ vertical segment, q is the total pixel number of the $j^{th}$ vertical segment, y is the $y^{th}$ pixel of the $j^{th}$ vertical segment, $V_{j(y)}$ is the luminance value of the $j^{th}$ pixel of the $j^{th}$ vertical segment, and j, q, and y are all positive integers.

In addition, the segments to be compensated for color shading in regions of the color block image described in Step S700 are $\{H_1V_1, H_2V_1, \ldots, H_iV_1, \ldots, H_{m-1}V_1, H_mV_1, H_1V_2, H_2V_2, \ldots, H_iV_2, \ldots, H_{m-1}V_2, H_mV_2, \ldots, H_1V_j, H_2V_j, \ldots, H_iV_j, \ldots, H_{m-1}V_j, H_mV_j, \ldots, H_1V_n, H_2V_n, \ldots, H_iV_n, \ldots, H_{m-1}V_n, H_mV_n\}$, and the color shading compensation coefficients of the regions are $\{FH_1V_1, FH_2V_1, \ldots, FH_iV_1, \ldots, FH_{m-1}V_1, FH_mV_1, FH_1V_2, FH_2V_2, \ldots, FH_iV_2, \ldots, FH_{m-1}V_2, FH_mV_2, \ldots, FH_1V_j, FH_2V_j, \ldots, FH_iV_j, \ldots, FH_{m-1}V_j, FH_mV_j, \ldots, FH_1V_n, FH_2V_n, \ldots, FH_iV_n, \ldots, FH_{m-1}V_n, FH_mV_n\}$, where m is the total number of the horizontal segments of the color block image, n is the total number of the vertical segments of the color block image, $H_iV_j$ is the $i^{th}$ horizontal and $j^{th}$ vertical segment, $FH_iV_j$ is the color shading compensation coefficient of the $i^{th}$ horizontal and $j^{th}$ vertical segment, and m, n, i, and j are positive integers.

Equations for calculating the color shading compensation coefficients of the regions are as follows:

$$FH_1V_1 = FI_1 \times FV_1 \times FC_1, FH_2V_1 = (FI_1+FI_2) \times FV_1 \times FC_2,$$

$$FH_3V_1 = (FI_1+2\times FI_2) \times FV_1 \times FC_3, \ldots, FH_{1+D}V_1 = (FI_1+D\times FI_2) \times FV_1 \times FC_{1+D},$$

$$FH_{1+D+1}V_1 = (FI_1+D\times FI_2+FI_3) \times FV_1 \times FC_{1+D+1}, \ldots,$$

$$FH_1V_j = FI_1 \times FV_j \times FC_1, FH_2V_j = (FI_1+FI_2) \times FV_j \times FC_2,$$

$$FH_3V_j = (FI_1+2\times FI_2) \times FV_j \times FC_3, \ldots, FH_{1+D}V_j = (FI_1+D\times FI_2) \times FV_j \times FC_{1+D},$$

$$FH_{1+D+1}V_j = (FI_1+D\times FI_2+FI_3) \times FV_j \times FC_{1+D+1}, \ldots,$$

where D and j are positive integers.

As can be seen from the above description, the compensation method for alleviating color shading in a digital image of the present invention can solve the disadvantages of the prior art. As compared with the prior art, the present invention can save a significant amount of memory and accurately compensate for color shading in the color block image, and thus can avoid the overcompensation problem in the prior art.

What is claimed is:

1. A compensation method for alleviating color shading in a digital image, adapted to correct a color shading phenomenon in a digital image that causes luminance differences between regions in the digital image, the compensation method comprising:
    providing a uniform color block, and capturing a color block image of the color block;
    cutting the color block image into a plurality of horizontal segments in a horizontal direction, and calculating horizontal compensation coefficients corresponding to the plurality of horizontal segments, respectively;
    performing an interpolation process to linearly interpolate the horizontal compensation coefficients, so as to generate a plurality of horizontal interpolation coefficients;
    finding out corresponding horizontal compensation coefficients of the same horizontal segments according to the plurality of horizontal interpolation coefficients, and dividing each of the plurality of horizontal interpolation coefficients by the corresponding horizontal compensation coefficients to obtain a plurality of horizontal correction coefficients;
    multiplying the plurality of horizontal correction coefficients by corresponding horizontal interpolation coefficients, respectively, so as to obtain a plurality of determination horizontal correction coefficients, and obtaining determination horizontal correction coefficients corresponding to all the plurality of horizontal segments, respectively, by linearly interpolating any two adjacent determination horizontal correction coefficients of the plurality of determination horizontal correction coefficients;
    cutting the color block image into a plurality of vertical segments in a vertical direction, and calculating vertical compensation coefficients corresponding to the plurality of vertical segments, respectively;
    multiplying the plurality of determination horizontal correction coefficients by the vertical compensation coefficients, respectively, to obtain a color shading compensation coefficient of each segment of the plurality of vertical segments of the color block image, respectively; and
    multiplying an average luminance value of each segment of the plurality of vertical segments of the color block image by a corresponding color shading compensation coefficient, respectively, thus compensating for color shading in the color block image.

2. The compensation method for alleviating color shading in a digital image according to claim 1, wherein the color block image comprises green pixels, red pixels, and blue pixels.

3. The compensation method for alleviating color shading in a digital image according to claim 1, wherein the step of calculating the horizontal compensation coefficients corresponding to the plurality of horizontal segments, respectively, comprises:
    calculating a horizontal average luminance value corresponding to each horizontal segment, respectively;
    selecting a largest average luminance value from the horizontal average luminance values corresponding to the plurality of horizontal segments, and defining the largest average luminance value as a horizontal reference luminance value; and
    dividing the horizontal reference luminance value by the horizontal average luminance values, so as to generate the horizontal compensation coefficients.

4. The compensation method for alleviating color shading in a digital image according to claim 1, wherein the step of calculating the vertical compensation coefficients corresponding to the plurality of vertical segments, respectively, comprises:
    calculating a vertical average luminance value corresponding to each vertical segment;
    selecting a largest average luminance value from the vertical average luminance values corresponding to the plurality of vertical segments, and defining the largest average luminance value as a vertical reference luminance value; and
    dividing the vertical reference luminance value by the vertical average luminance values, so as to generate the vertical compensation coefficients.

5. The compensation method for alleviating color shading in a digital image according to claim 1, wherein the plurality of horizontal interpolation coefficients constitute a plurality of linear line segments, and each linear line segment comprises a reference coefficient and a plurality of difference coefficients obtained by interpolation using the reference coefficient as a starting value.

6. The compensation method for alleviating color shading in a digital image according to claim 5, wherein the reference coefficient is a horizontal compensation coefficient of a horizontal segment closest to edges of the color block image.

* * * * *